United States Patent [19]
Corrigan et al.

[11] Patent Number: 5,734,910
[45] Date of Patent: Mar. 31, 1998

[54] INTEGRATING MULTI-MODAL SYNCHRONOUS INTERRUPT HANDLERS FOR COMPUTER SYSTEM

[75] Inventors: Michael Joseph Corrigan, Rochester, Minn.; Steven Leonard Jones, Austin, Tex.; Larry Wayne Loen, Rochester, Minn.; David Robert Russell, Jr., New Hope, Minn.; Philip Braun Winterfield, Rochester, Minn.

[73] Assignee: International Business Machines Corporation, Armonk, N.Y.

[21] Appl. No.: 577,831

[22] Filed: Dec. 22, 1995

[51] Int. Cl.⁶ .................................................. G06F 9/46
[52] U.S. Cl. ........................................ 395/734; 395/742
[58] Field of Search ................................. 395/733–742, 395/724

[56] References Cited

U.S. PATENT DOCUMENTS

| | | | |
|---|---|---|---|
| 4,779,187 | 10/1988 | Letwin | 395/742 |
| 4,812,967 | 3/1989 | Hirosawa et al. | 395/742 |
| 4,993,017 | 2/1991 | Bachinger et al. | 370/360 |
| 5,155,853 | 10/1992 | Mitsuhira et al. | 395/734 |
| 5,193,195 | 3/1993 | Miyazaki | 395/735 |
| 5,274,826 | 12/1993 | Kardach et al. | 395/733 |
| 5,291,614 | 3/1994 | Baker et al. | 395/800 |
| 5,303,378 | 4/1994 | Cohen | 395/700 |
| 5,339,437 | 8/1994 | Yuen | 395/700 |
| 5,369,767 | 11/1994 | Dinwiddie, Jr. et al. | 395/737 |
| 5,369,770 | 11/1994 | Thomason et al. | 395/733 |
| 5,371,879 | 12/1994 | Schiffleger | 395/500 |
| 5,487,146 | 1/1996 | Guttag et al. | 395/166 |
| 5,511,217 | 4/1996 | Nakajima et al. | 395/800 |

OTHER PUBLICATIONS

IBM Technical Disclosure Bulletin, vol. 34, No. 10B, Mar. 1992, "Interrupt–Driven Task Scheduler for Imbedded Control Systems".

IBM Technical Disclosure Bulletin, vol. 35, No. 4B, Sep. 1992, "High Speed External Interrupt Handler for Real Time System".

*Primary Examiner*—Ayaz R. Sheikh
*Attorney, Agent, or Firm*—Felsman, Bradley, Gunter & Dillon

[57] ABSTRACT

A synchronous interrupt handler for a processing system executing multiple modes of operation employs a minimum number of lines of interrupt handler code written to execute at the "zeroth" level, is combined with a virtualized interrupt vector table. An identical zeroeth level handler is inserted at each of the processor's interrupt vector entry pints. These short code sequences are the first to gain control following an interrupt. They are handwritten in the platform's native instruction set to be mode-independent. For example, if the platform's processor does not alter the "endianness" of the machine state following an interrupt, the "zeroth level" code must be written for endian neutrality; likewise, for ³²⁄₆₄-bit mode, etc. For each mode of operation, there is created a Virtualized Vector Table to represent the proper interrupt handlers for each physical interrupt level. Each task data structure, implicitly reflecting its unique mode of operation, contains a pointer to its virtualized vector table. The zeroeth-level handlers then extract the virtualized vector table reference for their own interrupt level and indirectly pass control to the preloaded table value.

14 Claims, 3 Drawing Sheets

INTEGRATING MULTI-MODAL SYNCHRONOUS INTERRUPT HANDLERS FOR COMPUTER SYSTEM

BACKGROUND OF THE INVENTION

1. Technical Field

The present invention relates to interrupt handlers for data processing systems and more particularly relates to improvements in operating systems for data processing systems.

2. Description of the Related Art

A new generation of computing platforms have emerged, mostly RISC-based, which are capable of dynamically switching modes of operation. For example, a 64-bit processor may run its operating system software in a 64-bit, tags active, big endian mode and switch to 32-bit, tags inactive, little endian mode for some portion of its user tasks. Computing platforms of this type may support several modes of operation when running either user tasks or system tasks. In prior such systems, when interrupts are taken for a task running in one mode of operation, the interrupt handler, in most cases, must have been written for specifically that mode and could not run correctly in any other mode. On a platform with a micro-kernel-based operating system, a user-level task may be able to attach its own interrupt handler, requiring its own specific operating mode, to a given interrupt vector level. There has been no capability for system software running on such platforms to efficiently manage multiple interrupt handlers for any given vector level, in response to the current mode of operation.

In prior interrupt handlers, one or more impediments were present, such as (1) synchronous interrupts have required a switch from the current mode of operation, (2) excessive overhead was incurred from the point of interruption to the proper handler, (3) the effects of the interrupt routing impacted "state" registers, stack usage or save-state mechanisms for subsequently-invoked interrupt handler code, (4) cache line perturbations were excessive, or (5) the solutions were specific to one mode rather than extensible.

SUMMARY OF THE INVENTION

It is an object of the invention to provide improved interrupt handlers for data processing systems.

Another object is to provide an interrupt handler for a RISC-based processor system which has a number of different operating modes and allows dynamic switching between modes, particularly a handler for synchronous interrupts which does not require a switch from the current mode of operation in such a system, and one which is extensible to other modes of platform operation.

A further object is to provide a synchronous interrupt handler for a multi-mode platform which does not require excessive overhead incurred from the point of interruption to the proper handler, and one in which cache line perturbations are minimized.

Another object is to provide a synchronous interrupt handler for a multi-mode platform in which the effects of the interrupt routing does not adversely impact "state" registers, stack usage or save-state mechanisms for subsequently-invoked interrupt handler code.

The above as well as additional objects, features, and advantages of the present invention will become apparent in the following detailed written description.

According to one embodiment of the invention, synchronous interrupt handlers for a processing system executing multiple modes of operation (operating systems or the like) employs a minimum number of lines of interrupt handler code written to execute at the "zeroth" level, i.e., execute as the first instructions of the interrupt handler, combined with a virtualized interrupt vector table. An identical zeroeth level handler is inserted at each of the processor's interrupt vector entry points. These short code sequences are the first to gain control following an interrupt. They are handwritten in the platform's native instruction set to be mode-independent. For example, if the platform's processor does not alter the "endianness" of the machine state following an interrupt, the "zeroeth level" code must be written for endian neutrality; likewise, for $32/64$-bit mode, etc.

Since an interrupt may in itself alter the mode or machine state of a processor (this is a machine-dependent characteristic), a correctly functioning multi-modal synchronous interrupt handler system needs to maintain information about the machine state at the point of interruption. A common way of accomplishing this is to utilize a Task Pointer located in a register that is easily accessible from within the interrupt context. This pointer will yield, through some level of indirection, the machine state or mode at the point of interruption. For example, on a kernel-based system, each running thread or task has associated with it a task data structure which includes information on the mode of operation of the thread which incurred the interrupt. A pointer to this data structure is typically kept in a hardware register.

The multi-modal synchronous interrupt handler system according to this invention makes use of the fact that the interrupted task's data structure can at any given point reflect one and only one mode of operation. A task which switches context to a different mode of operation must have its new state reflected in the task data structure. For each possible mode of operation, there is created a Virtualized Vector Table to represent the proper interrupt handlers for each physical interrupt level. Each task data structure, implicitly reflecting its unique mode of operation, must now additionally contain a pointer to its virtualized vector table.

Note that "mode" here refers to both hardware and software. There would be a separate Virtualized Vector Table for hardware variations such as big endian versus little endian, 32-bit versus 64-bit (a total of as many as four such tables for these two attributes alone). But there also might be tables for differing operating systems or operating environments. This might relate, for instance, to operating system specific variations in how a given interrupt, such as "divide by zero" is presented to its applications. Exactly which attributes are significant and so require tables will vary in a given computer system. But, whenever an interrupt handler with a different nature needs to be given control based on the variable attributes of the currently executing task or thread, then the corresponding task data structure will point to its own specific version of the Virtualized Vector Table. If all combinations of "endian," 32-bit versus 64-bit and two different operating systems were all defined, there would be a total of eight VVTs and each task data structure would be initialized to point to the correct one of the eight variants its execution attributes were defined to utilize. While according to the invention, there is no limit on the number of such tables, yet in a practical system the total number of tables will likely be few in number. Once these tables are defined, and the correct pointer placed in the task data structure for each type of executing task, then the zeroth level handlers are required only to extract the virtualized vector table reference for its own interrupt level and indirectly pass control to the preloaded table value.

This "virtualized interrupt" approach, when implemented on a representative RISC hardware platform, such as PowerPC, can easily yield the desired properties. It is implemented in approximately 20 "modality neutral" RISC instructions. It has no additional state save or stack requirements beyond the use of a spare special purpose register. It requires no additional mode switches. It has minimal impact on the cache performance, since the task structure for the currently running thread is likely to be already resident in cache. It is easily extensible to as many modes as necessary by creating new virtualized vector tables and initializing pointers to them at task creation time.

The interrupt handlers according to the invention can be thought of as having two purposes. First, to give software "first-level" interrupt handlers control in a plurality of different hardware modes (that is, the specific ones they expect, even when multiple such first-level handlers are present for each of several software environments, all differing somewhat in hardware mode) and also, secondly, to permit various layers of code merged together in a microkernel environment to execute under their own software architecture as early as possible. This latter would mean that the invention has applicability even if all of the software ran in the same hardware modes (that is, the same endian same bit width, etc.). This is true because the zeroth level concept allows the sharing of a system-wide hardware resource (interrupt vectors) by multiple software architectures. Note that there is a kind of "vertical" spread as well; if certain tasks and threads in an operating system have a different interrupt handler for cases than is the norm, use of the invention can easily and efficiently adapt to such changes. Thus, even a traditional environment can be adapted to the invention with advantage if the environment has sufficient variability in its interrupt handling strategy.

DESCRIPTION OF THE FIGURES

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
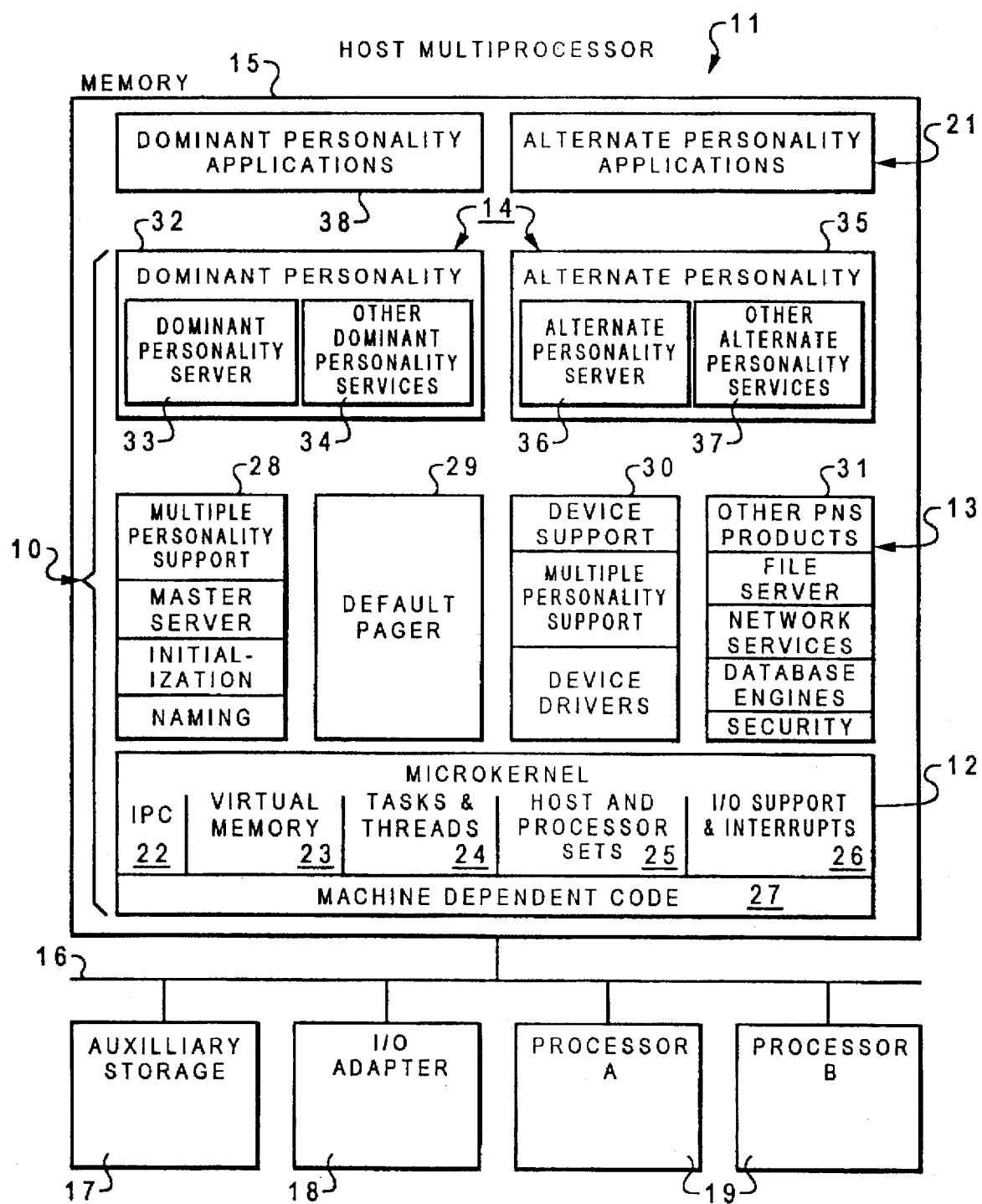
FIG. 1 is a functional block diagram of a microkernel system in the memory of a host multi-processor such as a PowerPC, showing how the microkernel and personality-neutral services run multiple operating system personalities.

FIG. 1 is a functional block diagram of a software system which is referred to as the microkernel system, executing on a host multi-processor 11, showing how the microkernel 12 and personality-neutral services 13 run multiple operating system personalities 14 on a variety of hardware platforms. The microkernel system executing on a PowerPC RISC-type platform is an advantageous system for employing the synchronous interrupt handler of the invention. The microkernel system can have tasks in various modes, such as 32-bit or 64-bit, big-endian/little-endian.

This microkernel technology is a way to structure systems software to reduce its complexity and increase the range of hardware and system configurations that are supported by an operating system implementation. Instead of creating a single, monolithic system, developers create a set of servers that can be configured together in a number of ways to provide a variety of target operating environments. In addition, the microkernel lets multiple operating environments execute together on a single hardware system. The microkernel introduces the idea that a small, message-based piece of systems software running in the most privileged state of a computer can support the rest of the operating system as a set of server programs.

The host multi-processor 11 shown in FIG. 1 includes memory 15 (i.e., the software system is executing from memory 15) connected by means of a bus 16 to an auxiliary storage 17 which can be, for example, a disc drive, a read-only or a read/write optical storage, or any other bulk storage device. Also connected to the bus 16 is the I/O adaptor 18, which, in turn, may be connected to a keyboard, a monitor display, a telecommunications adaptor, a local area network adaptor, a modem, multi-media interface devices, or other I/O devices. Also connected to the bus 16 are first and second processors 19. The example shown in FIG. 1 is of a symmetrical multi-processor configuration wherein the two uni-processors 19 share a common memory address space 15. Other configurations of single or multiple processors can be shown as equally suitable examples. The processors 19 can be, for example, an Intel 386™ CPU, Intel 486™ CPU a Pentium™ processor, a Power PC™ processor, or other uni-processor devices.

The memory 15 includes the microkernel system 10 stored therein, which comprises the microkernel 12, the personality-neutral services (PNS) 13, and the personality servers 14. The microkernel system 10 serves as the operating system for the application programs 21 and 38 stored in the memory 15.

A feature of the microkernel is providing an operating system that behaves like a traditional operating system such as UNIX or OS/2. In other words, the operating system has the personality of OS/2 or UNIX, or some other traditional operating system.

The microkernel 12 contains a small, message-passing nucleus of system software running in the most privileged state of the host multi-processor 11, that controls the basic operation of the machine. The microkernel system 10 includes the microkernel 12 and a set of servers and device drivers that provide personality-neutral services 13. As the name implies, the personality neutral servers and device drivers are not dependent on any personality such as UNIX or OS/2. They depend on the microkernel 12 and upon each other. The personality servers 14 use the message-passing services of the microkernel 12 to communicate with the personality-neutral services 13. For example, UNIX, OS/2 or any other personality server can send a message to a personality-neutral disk driver and ask it to read a block of data from the disk. The disk driver reads the block and returns it in a message. The message system is optimized so that large amounts of data are transferred rapidly by manipulating pointers; the data itself is not copied.

By virtue of its size and ability to support standard programming services and features as application programs, the microkernel 12 is simpler than a standard operating system. The microkernel system 10 is broken down into modular pieces that are configured in a variety of ways, permitting larger systems to be built by adding pieces to the smaller ones. For example, each personality-neutral server 13 is logically separate and can be configured in a variety of ways. Each server runs as an application program and can be debugged using application debuggers. Each server runs in a separate task and errors in the server are confined to that task.

FIG. 1 shows the microkernel 12 including the interprocess communications module (IPC) 22, the virtual memory module 23, tasks and threads module 24, the host and processor sets 25, I/O support and interrupts 26, and machine dependent code 27.

The personality-neutral services 13 shown in FIG. 1 include the multiple personality support 28 which includes the master server, initialization, and naming. It also includes the default pager 29 and the device support 30 which includes multiple personality support and device drivers. It further includes other personality-neutral products 31, including a file server, network services, database engines and security.

The personalities 14 are, for example, the dominant personality 32 which can be, for example, a UNIX personality. It includes a dominant personality server 33 which would be a UNIX server, and other dominant personality services 34 which would support the UNIX dominant personality. An alternate personality 35 can be, for example, OS/2. Included in the alternate personality 35 are the alternate personality server 36 which would characterize the OS/2 personality, and other alternate personality services 37 (for OS/2).

Dominant personality applications 38 shown in FIG. 1, associated with the UNIX dominant personality example, are UNIX-type applications which would run on top of the UNIX operating system personality 32. The alternate personality applications 21 shown in FIG. 1, are OS/2 applications which run on top of the OS/2 alternate personality operating system 35.

FIG. 1 shows that the microkernel system 10 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uni-processors, different threads run at different times. All of the support needed for multiple processors is concentrated into the small and simple microkernel 12.

This microkernel system 10 is a unique foundation for operating systems and provides a comprehensive environment for operating system development with the following features: support for multiple personalities; extensible memory management; interprocess communication; multi-threading; and multi-processing. The microkernel system 10 provides a set of kernel services implemented as a pure kernel and an extensive set of services for building operating system personalities implemented as a set of user-level servers.

The objectives of the microkernel system 10 include the following:

(a) permit multiple operating system personalities to work together in harmony;

(b) provide common programming for low-level system elements, such as device drivers and file systems;

(c) provide the ability to efficiently invoke an operating-system-dependent or other execution-mode-dependent interrupt handling code to handle hardware or software variations in interrupt handling function;

(d) exploit parallelism in both operating system and user applications;

(e) support large, potentially sparse address spaces with flexible memory sharing;

(f) allow transparent network resource access;

(g) be compatible with existing software environments, such as OS/2 and UNIX; and (h) portable (to 32-bit and 64-bit platforms).

The microkernel system 10 is based on the following concepts:

(a) user-mode tasks performing many traditional operating system functions (for example, file system and network access);

(b) a basic set of user-level run-time services for creating operating systems.

(c) a simple, extensible communication kernel;

(d) an object basis with communication channels as object references; and (e) a client/server programming model, using synchronous and asynchronous inter-process communication.

A feature of the microkernel system 10 is to provide a simple, extensible communication kernel. It is an objective of the microkernel system 10 to permit the flexible configuration of services in either user or kernel space with the minimum amount of function in the kernel proper. The kernel must provide other support besides task-to-task communication, including:

(a) management of points of control (threads);

(b) resource assignment (tasks);

(c) support of address spaces for tasks; and (d) management of physical resources, such as physical memory, processors, interrupts, DMA channels, and clocks.

User-mode tasks implement the policies regarding resource usage. The kernel simply provides mechanisms to enforce those policies. Logically above the kernel is the personality-neutral services 13 (PNS) layer. The PNS 13 provide a C run-time environment, including such basic constructs as string functions, and a set of servers which include: Name Server—allows a client to find a server; and Master Server allows programs to be loaded and started.

One feature of the microkernel system 10 is to minimize abstractions provided by the kernel itself, but not to be minimal in the semantics associated with those abstractions. Each of the abstractions provided have a set of semantics associated with it, and a complex set of interactions with the other abstractions. The main kernel abstractions are:

(a) Task—Unit of resource allocation, large access space and port right (b) Thread—Unit of CPU utilization, lightweight (low overhead)

(c) Port—A communication channel, accessible only through the send/receive capabilities or rights (d) Message—A collection of data objects (e) Memory object—The internal unit of memory management The microkernel system 10 does not provide the traditional concept of process because all operating system environments have considerable semantics associated with a process (such as user ID, signal state, and so on). It is not the purpose of the microkernel to understand or provide these extended semantics. Many systems equate a process with an execution point of control; some systems do not.

The microkernel 12 supports multiple points of control separately from the operating system environment's process. The microkernel provides the following two concepts: (a) Task and (b) Thread.

The kernel provides some memory management; memory is associated with tasks, and memory objects are the means by which tasks take control over memory management. The microkernel system 10 provides the mechanisms to support large, potentially sparse virtual address spaces. Each task has an associated address map (separate from the address maps for the other tasks, i.e., a separate address space) that is maintained by the kernel and controls the translation of virtual address in the task's address space into physical addresses. As in virtual memory systems, the contents of the entire address space of any given task might not be completely resident in physical memory at the same time, and mechanisms must exist to use physical memory as a cache for the virtual address spaces of tasks. Unlike traditional virtual memory designs, the microkernel system 10 does not implement all of the caching itself. It gives user mode tasks the ability to participate in these mechanisms. The PNs include a user task, the default pager 29, that provides paging services for memory.

Unlike other resources in the microkernel system 10, virtual memory is not referenced using ports. Memory can be referenced only by using virtual addresses as indices into a particular task's address space. The memory and the associated address map that defines a task's address space can be partially shared with other tasks. A task can allocate new ranges of memory within its address space, de-allocate them, and change protections on them. It can also specify inheritance properties for the ranges. A new task is created by specifying an existing task as a base from which to construct the address space for the new task. The inheritance attribute of each range of the memory of the existing task determines whether the new task has that range defined and whether that range is virtually copied or shared with the existing task.

Any given region of memory is backed by a memory object. A memory manager task provides the policy governing the relationship between the image of a set of pages while cached in memory (the physical memory contents of a memory region) and the image of that set of pages when not cached (the abstract memory object). The PNS 13 has a default memory manager or pager 29 that provides basic non-persistent memory objects that are zero-filled initially and paged against system paging space.

The microkernel system 10 uses a client/server system structure in which tasks (clients) access services by making requests of other tasks (servers) through messages sent over a communication channel. Since the microkernel 12 provides very few services of its own (for example, it provides no file service), a microkernel 12 task must communicate with many other tasks that provide the required services. The communication channels of the interprocess communication (IPC) mechanism are called ports. A message is a collection of data, memory regions, and port rights. A port right is a name by which a task, that holds the right, names the port. A task can manipulate a port only if it holds the appropriate port rights. Only one task can hold the receive right for a port. This task is allowed to receive (read) messages form the port queue. Multiple tasks can hold send rights to the port that allow them to send (write) messages into the queue. A task communicates with another task by building a data structure that contains a set of data elements, and then performing a message-send operation on a port for which it holds a send right. At some later time, the task holding the receive right to that port performs a message-receive operation. This message transfer is an asynchronous operation. The message is logically copied into the receiving task (possibly with copy-on-write optimizations). Multiple threads within the receiving task can be attempting to receive messages from a given port but only one thread will receive any given message.

In one embodiment, the interrupt handler of the invention is a part of the microkernel code 12, i.e., the machine dependent code 27. In the embodiment to be described, the microkernel is the operating system on a PowerPC platform, the details of which have been published in May et al., "The PowerPC Architecture: A Specification for a New Family of RISC Processors," second edition, Morgan Kaufman 1994, ISBN 1-55860-316-6, which is incorporated herein by reference. It describes the instructions, registers, and other details of the PowerPC.

Note carefully that the microkernel 10 might contain either PNS 13, personalities 32, and 35, or applications 38 and 21 whose execution modes, such as 32-bit versus 64-bit or big endian versus little endian might not all be identical. Similarly, they might have different requirements on how hardware interrupts are abstracted and described to their various error handler routines. Any of these details may require, potentially from very early execution, a mode-unique interrupt handler sensitive to these differences. Since the interrupt itself does not typically contain enough information to distinguish all of this hardware and software state, and since rapid handling of the interrupts is always of interest, it is important to rapidly identify the correct version or the interrupt handler and give it control in its specified operating mode.

Figure 2:
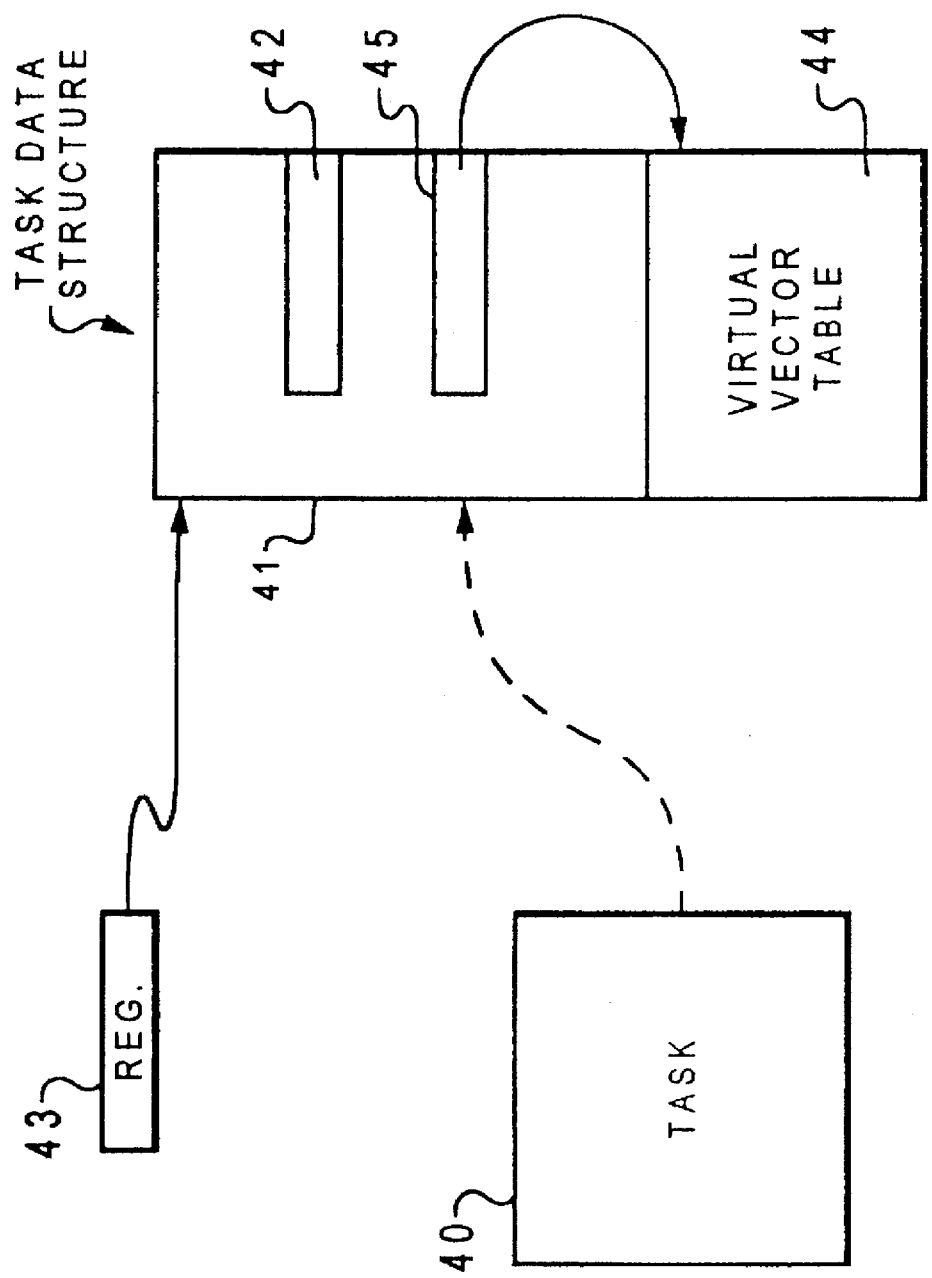
FIG. 2 is a diagram of data structures for executing tasks on the system of FIG. 1.

In the example embodiment of the invention, a synchronous interrupt handler for the processing system of FIG. 1 executing multiple modes of operation as described employs a minimum number of lines of interrupt handler code, as given in the Appendix and as described below with reference to FIG. 2; this code is written to execute at the "zeroth" level, i.e., to get control at the very beginning of interrupt execution. The use of a minimum amount of code is combined with a virtualized interrupt vector table, i.e., an interrupt vector table is stored at an address referenced from the task structure. An identical zeroeth level handler as in the Appendix is inserted at each of the interrupt vector entry points of the processor of FIG. 1. These short code sequences are the first to gain control following an interrupt. They are hand-written in the native instruction set of the platform of FIG. 1 to be mode-independent. For example, if the processor 11 does not alter the "endianness" of the machine state following an interrupt, the "zeroeth level" code must be written for endian neutrality; likewise, for $^{32}/_{64}$-bit mode, etc. Conversely, if the particular machine architecture places the machine in a known mode on an interrupt, such as always big endian or always 32-bit mode, the only requirement of this invention is that it do so in a manner that enables the state of tasks in different modes than the zeroth mode is running in to have their state information properly collectable (e.g., to be able to get all 64-bits of the few registers needed by the zeroth level handler code, even in a 32-bit mode). There are many such variations and those skilled in the art can readily adapt a typical architecture to this requirement.

Since an interrupt may in itself alter the mode or machine state of the processor 11 (this is a machine-dependent characteristic), a correctly functioning multi-modal synchronous interrupt handler system needs to maintain information about the machine state at the point of interruption. A common way of accomplishing this is to utilize a Task Pointer located in a register that is easily accessible from within the interrupt context. This pointer will yield, through some level of indirection, the machine state or mode at the point of interruption. For example, on the kernel-based system of FIG. 1, each running thread or task 40 of FIG. 2 has associated with it a task data structure 41 which includes information 42 on the mode of operation of the thread which incurred the interrupt. A pointer 43 to this data structure 41 is typically kept in a hardware register of the PowerPC.

The multi-modal synchronous interrupt handler system according to this invention makes use of the fact that the data structure 41 of an interrupted task 40 can at any given point reflect one and only one mode of operation. A task which switches context to a different mode of operation must have its new state reflected in the task data structure 41. For each possible mode of operation, there is created a virtualized vector table 44 to represent the proper interrupt handlers for each physical interrupt level. Each task data structure 41, implicitly reflecting its unique mode of operation, must now additionally contain a pointer 45 to its virtualized vector table 44. The zeroeth level handlers are then required only to extract the virtualized vector table reference 45 for its own interrupt level and indirectly pass control to the preloaded table value.

Those skilled in this art will appreciate that this virtualized vector table 44 could be incorporated via copy into the task data structure 41; the virtualized vector table 44 is described separately for ease of exposition.

This "virtualized interrupt" approach, when implemented on a representative RISC hardware platform, such as PowerPC, yields the desired properties. It is implemented in approximately twenty "modality neutral" RISC instructions as seen in the Appendix. It has no additional state save or stack requirements beyond the use of a spare special purpose register as explained in the description of the code below. It requires no additional mode switches. It has minimal impact on the cache performance, since the task structure 41 for the currently running thread 40 is likely to be already resident in cache. It is easily extensible to as many modes as necessary by creating new virtualized vector tables 44 and initializing pointers 45 to them at task creation time.

The following registers from the PowerPC are referenced:

GPR3, GPR4—two of the general purpose registers.

MSR—the machine state register (controls hardware modes).

CURTASK—which is also SPRG1.

SPARESPRG—which is also SPRG2.

SRR0 and SRR1.

SRR0 and SRR1 are registers intended for general programming use in interrupt handling. When an interrupt occurs, SRR0 gets the address of the instruction to resume upon completion of the interrupt, SRR1 gets the value of the MSR just before the interrupt occurred. All except the GPRs are considered "special purpose registers" and are brought in and out of GPRs with the instructions as described below.

The instructions from the PowerPC instruction set which are used in the interrupt handler described below are explained in the following paragraphs. The complete instruction set, the register sets, as well as additional details of instruction execution and addressing, are given in the PowerPC Architecture book identified above. "Designated register" means "designated general purpose register" in the descriptions following.

The instruction mfspr or "Move From Special Purpose Register" moves the contents of a designated SPR or Special Purpose Register to a designated register.

The instruction mtspr or "Move To Special Purpose Register" moves the contents of a designated register to a designated SPR or Special Purpose Register.

The instruction mfmsr or "Move From Machine State Register" moves the contents of the MSR or Machine State Register to a designated register. This is a supervisor-level instruction.

The instruction rotldi or "Rotate Left Immediate" shifts the contents of a designated register to the left by a designated number of bits.

The instruction rotrdi or "Rotate Right Immediate" shifts the contents of a designated register to the right by a designated number of bits.

The instruction ori or "OR Immediate" OR's the contents of a designated register with a 16-bit immediate, right-justified, unsigned field and places the result in a designated register.

The instruction mtmsr or "Move To Machine State Register" moves the contents of a designated register to the MSR or Machine State Register. This is a supervisor-level instruction.

The instruction isync or "Instruction Synchronize" causes the machine to wait for all previous instructions to complete and then discards any fetched instructions, causing subsequent instructions to be fetched (or refetched) from memory and to execute in the context established by the previous instructions. The isync instruction will cause a refetch serialization which waits for all prior instructions to complete and then executes the next sequential instruction. Execution of subsequent instructions is held until such time as all previous instructions have been completed to the point where they can no longer cause an exception and all store queues have completed translation. Any instruction after an isync sees all effects of prior instructions. This instruction is context synchronizing.

The instruction std or "Store Double Word" causes the contents of a designated register to be stored in memory addressed by the EA or effective address.

The instruction ld or "Load Double Word" causes the contents of a location in memory addressed by the EA or effective address to be loaded to a designated register.

The rfi instruction is generally meant to resume control from an interrupt by atomically loading the MSR (which contains the new execution mode information) and the instruction counter (the location of the next instruction). The rfi instruction can also be used to change modes within the supervisor layers as will be done here.

The code used to implement the interrupt handler according to a preferred embodiment is set forth in the Appendix. This code is considered the zeroth level (first to execute) interrupt handler. Common terminology in this art refers to a "first level interrupt handler" which gains control on an interrupt. This description of the invention uses the term "zeroth level handler" to emphasize that this code is inserted before what would ordinarily be considered first level interrupt handlers. Its function is to fetch an indexed table entry to adjust the hardware mode of the machine and to fetch a routine which represents a hardware/software environment-specific interrupt handler for the current task and invoke it in the hardware mode that environment expects.

Note that the interrupt handler could be a hardware-specific default handler supplied by the microkernel 12, specific to a given personality 32 or 35, a given PNS 28, 29, 30, or 31, or a given application 21 or 38, as determined by the hardware and software requirements. Since the table is a vector, the code here described need not know or care; that issue is decided when the task is created (this embodiment assumes, for ease of exposition, that all threads in a task agree to use the same interrupt handlers); the zeroth level interrupt handler is simply able to invoke whatever interrupt handler the currently executing task and thread requires by referencing the pointer in the task data structure to the interrupt handler's hardware mode and its initial execution address.

This is accomplished by having a pointer in the base task structure (always in SPRG1) to a static table of interrupt vectors for the task and thread that was running. This table will contain the address of the first instruction of the current task's interrupt handler and the interrupt handler's new machine state register value.

Figure 3:
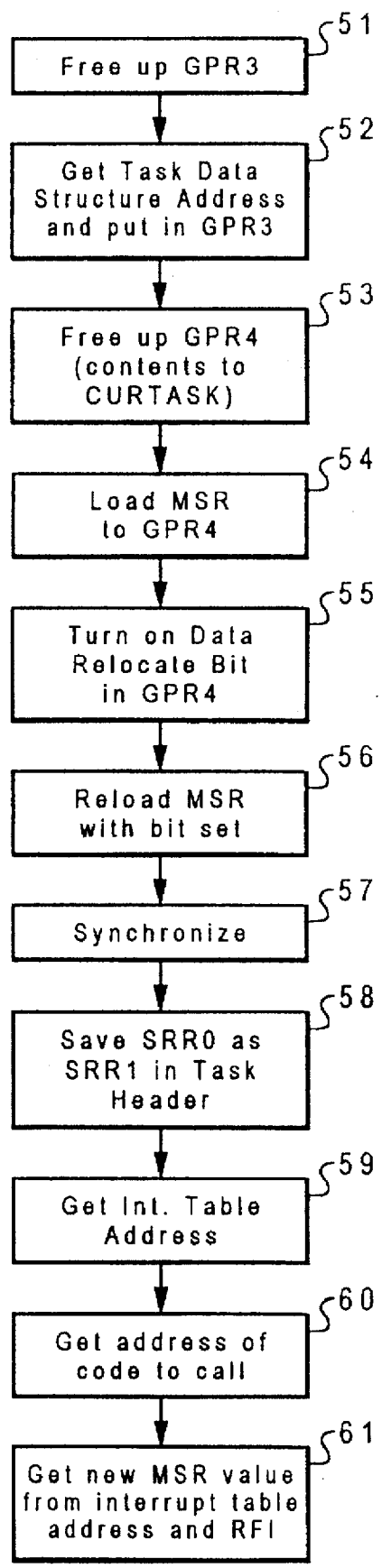
FIG. 3 is a flow chart for the interrupt handler code to be executed in the system of FIGS. 1 and 2 and as given in the Appendix.

The flow of the code is as follows, and as shown in the flow chart of FIG. 3. First the general purpose registers GPR3 and GPR4 of the PowerPC are freed up, as indicated by code lines 001–003 and blocks 51, 52 and 53. The contents of the GPR3 register are placed in a spare register, and the current task address is placed in GPR3. Next, the Data Relocate bit is turned on in the Machine State Register MSR. This is done by loading the current MSR contents to GPR4 at block 54 and line 004 of the code, then by rotate left, OR, and rotate right instructions, illustrated at block 55 in FIG. 3 and lines 004-to-007 of the code in the Appendix. The MSR is reloaded to the MSR register at line 008, block 56, so the content of MSR is ready to begin execution of the instructions for the exception processing, with Data Relocate on. An isync instruction is now executed at block 57, or line 009, to assure that any following instructions, not in the new execution mode, are used in the new execution mode. The contents of SRR0 and SRR1 are saved in the task header by code lines 010–014, block 58. The Interrupt Table address is now fetched at block 59, line 015. From this, the address of the code to call is fetched at block 60, code line 016. In block 61, code line 018 fetches the new MSR value and prepares it to be loaded. At code line 022, also in block 61, the rfi instruction is executed, which simultaneously loads the new MSR value (changing the hardware mode of the processor) and transfers control to the mode-specific interrupt handler in that desired execution mode.

Upon entry into the interrupt handler, the registers will be as follows:

SRR0 at the time of interrupt is in task header of TDE (intsrr0)

SRR1 at the time of interrupt is in task header of TDE (intsrr1)

SRR0←address of personality interrupt handler

SRR1←MSR from interrupt vector table

SPRG1←Current Task Address

SPRG2←GPR3 at time of interrupt

GPR3, GPR4 restored to values at time of interrupt

All other registers will be in the state they were when the interrupt occurred. Note that all subsequent interrupt handlers must restore SPRG1 to the current task.

While the invention has been particularly shown and described with reference to a preferred embodiment, it will be understood by those skilled in the art that various changes in form and detail may be made therein without departing from the spirit and scope of the invention.

APPENDIX

| | | | |
|---|---|---|---|
| 001 | mtspr | SPARESPR,GPR3 | # Free up GPR3 |
| 002 | mfspr | GPR3,CURTASK | # Get Task Data Structure Address |
| 003 | mtspr | CURTASK,GPR4 | # Free up GPR4 |
| 004 | mfmsr | GPR4 | # Get MSR |
| 005 | rotrdi | GPR4,GPR4,2 | # Get DR bit into low order 16 |
| 006 | ori | GPR4,GPR4,DR_SHIFTED_ON | # Turn on DR |
| 007 | rotldi | GPR4,GPR4,2 | # Align new MSR value |
| 008 | mtmsr | GPR4 | # Move new MSR value to MSR |
| 009 | isync | | # MSR change takes effect |
| 010 | mfspr | GPR4, SRR1 | # Retrieve SRR1 (old MSR) |
| 011 | std | GPR4,intsrr1(GPR3) | # Store old MSR in # Task Data Structure |
| 011.1 | mfspr | GPR4, SRR0 | # Get user's instr addr |
| 011.2 | std | GPR4,intssrr0(GPR3) | # Store in Task Data Structure |
| * Put user's GPR4 in Task Data Structure and restore CURTASK | | | |
| 012 | mfspr | GPR4,CURTASK | # Restore GPR4 (see line 003) |
| 013 | std | GPR4,intsaver4(GPR3) | |
| 014 | mtspr | CURTASK,GPR3 | |
| 015 | ld | GPR4,inttable(GPR3) | # Get interrupt Table Address |
| * Get address of code to call | | | |
| 016 | ld | GPR4,I_IntNum*cfvecentsize(GPR4) | |
| 017 | mtspr | SRR0,GPR4 | # Put into SRR0 |
| * Get MSR to run with | | | |
| 017.1 | ld | GPR4,inttable(GPR3) | |
| 018 | ld | GPR4,I_IntNum*cfvecentsize+ihnewsrr1(GPR4) | |
| 019 | mtspr | SRR1,GPR4 | # Put into SRR1 |
| * Restore GPR4 and GRP3 to values on interrupt entry | | | |
| 020 | ld | GPR4,intsaver4(GPR3) | |
| 021 | mfspr | GPR3,SPARESPR | # Restore GPR3 |
| * Call the appropriate interrupt handler in its expected execution mode | | | |
| 022 | rfi | | |

What is claimed is:

1. A method of operating a processor having a plurality of modes of operation, comprising the steps of:

providing at least two different operating systems for said processor;

executing a task on said processor under one of said two different operating systems, including generating a task data structure for said task, said task executing in a given one mode of said plurality of modes of operation;

creating a virtual vector table for each one of said plurality of modes of operation;

generating an interrupt of said task on said processor;

referencing an interrupt handler in response to said interrupt, said interrupt handler being in native code of said processor;

said interrupt handler saving state of said processor at the time of said interrupt by referencing said task data structure;

said task data structure providing access to said virtual vector table for said given one mode of operation;

executing said interrupt under said one of said operating systems from a vector in said virtual vector table.

2. A method according to claim 1 wherein said step of providing access includes storing a reference in said task data structure to said virtual vector table.

3. A method according to claim 1 wherein said interrupt handler operates at the highest level of priority of said processor to thereby be executed first upon occurrence of said interrupt.

4. A method according to claim 1 wherein said plurality of modes of operation include a 32-bit mode, a 64-bit mode, a big-endian mode and a little-endian mode.

5. A method according to claim 1 wherein said step of referencing said task data structure includes using contents of a hardware register of said processor.

6. A method according to claim 2 wherein said task data structure contains a pointer to said virtual vector table.

7. A method according to claim 1 wherein said plurality of modes of operation include a plurality of different modes of handling data.

8. An interrupt handler for a processor having a plurality of modes of operation and at least two different operating systems, comprising:

a task executing on said processor under one of said two different operating systems, the task including generating a task data structure for said task, said task executing in a given one mode of said plurality of modes of operation;

a virtual vector table for each one of said plurality of modes of operation;

an interrupt generator for generating an interrupt for interrupting execution of said task on said processor;

an interrupt handler referenced in response to said interrupt, said interrupt handler being in native code of said processor;

said interrupt handler saving state of said processor at the time of said interrupt by referencing said task data structure;

said task data structure accessing said virtual vector table for said given mode of operation;

said interrupt being executed under said one of said two different operating systems from a vector in said virtual vector table.

9. Apparatus according to claim 8 wherein said reference to said task data structure includes using contents of a hardware register of said processor.

10. Apparatus according to claim 8 wherein said accessing of said virtual vector table includes using a stored reference in said task data structure to said virtual vector table.

11. Apparatus according to claim 10 wherein said task data structure contains a pointer to said virtual vector table.

12. Apparatus according to claim 8 wherein said interrupt handler operates at the highest level of priority of said processor to thereby be executed first upon occurrence of said interrupt.

13. Apparatus according to claim 8 wherein said plurality of modes of operation include a plurality of different modes of handling data.

14. Apparatus according to claim 13 wherein said plurality of modes of handling data include a 32-bit mode, a 64-bit mode, a big-endian mode and a little-endian mode.

* * * * *